Oct. 20, 1942.   D. CRAMPTON   2,299,529
APPARATUS FOR CONTROLLING THE CONDITION OF MATERIAL
Filed June 10, 1937    2 Sheets-Sheet 1

INVENTOR
David Crampton
BY
Cooper, Kerr & Dunham
ATTORNEYS

INVENTOR
David Crampton
BY
Cooper, Kent & Dunham
ATTORNEYS

Patented Oct. 20, 1942

2,299,529

UNITED STATES PATENT OFFICE 2,299,529

APPARATUS FOR CONTROLLING THE CONDITION OF MATERIAL

David Crampton, Bloomfield, N. J., assignor to Wallace & Tiernan Products, Inc., Belleville, N. J., a corporation of New Jersey Application June 10, 1937, Serial No. 147,425

20 Claims. (Cl. 210—122.1)

This invention relates to apparatus controlled by change in the condition of material or of an object for automatically producing or maintaining a desired condition.

Prior to my invention, there was proposed an effluent rate of flow controller, controlled by means of a photo-electric cell scanning the turbidity of an effluent liquid such as water from a filter, said photo-electric cell, by means of relays, actuating an electrically operated water valve so that with any increase in turbidity the water valve tends to close and restrict the flow from the filter and conversely, with decrease in turbidity, the throttling valve opens to permit a greater flow from the filter.

One of the objects of my invention is to provide improved combinations and sub-combinations of apparatus for use in the system to which I have just referred.

A further object of my invention is to provide control means in the foregoing and similar systems whereby the system is periodically adjusted back towards a desired condition by a series of adjustments whose amount is proportional to the deviation of the system from the desired conditions. It has been found that this manner of adjustment prevents hunting and yet affords a rapid return to desired conditions, so that the arrangement of the invention is more efficient and satisfactory than systems heretofore available, in which a non-hunting control has been no more than approximately obtained.

Other objects and advantages will appear as the invention is hereinafter disclosed. While the apparatus was especially designed for the particular use above indicated, it may be used in other systems and for other purposes, within the scope of the appended claims.

Referring to the drawings.

Figure 1:
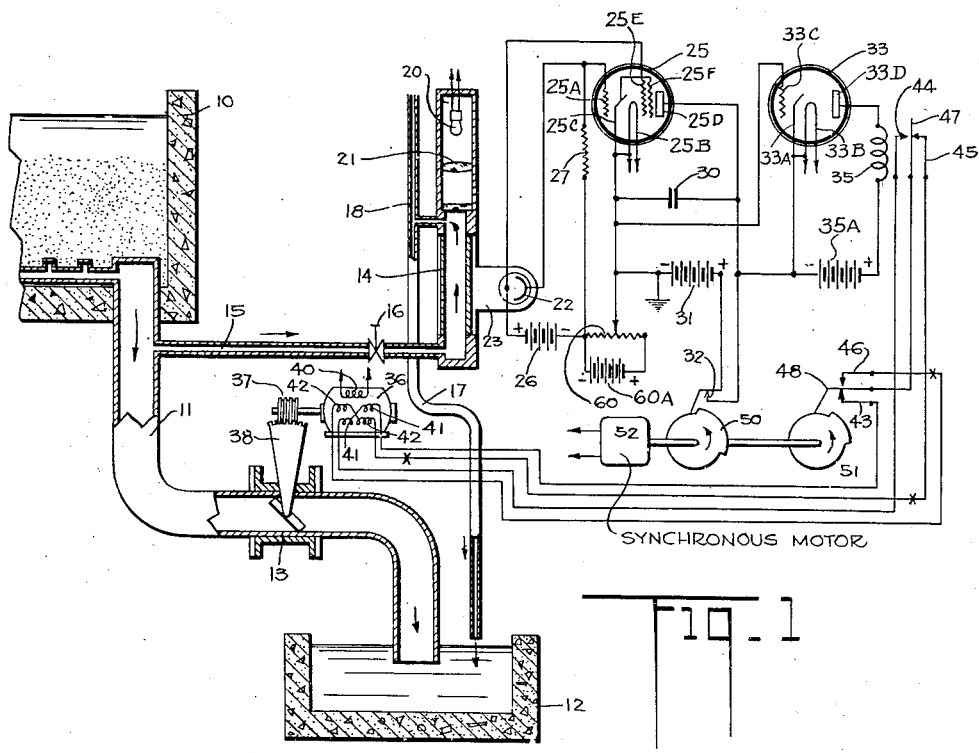
Fig. 1 is a somewhat diagrammatic view showing one form of my invention applied to the automatic control of the effluent from a filter.

Referring to Fig. 1 of the drawings, there is shown a filter bed 10, of the type commonly employed in a rapid sand filter plant, to which water to be filtered is supplied and from which the filtered water, i. e., the effluent or filtrate, is discharged through an effluent pipe 11 into the clear well 12 prior to its distribution throughout the succeeding system. A valve 13 of the butterfly type, is shown provided in the pipe 11 to control the flow of the filtrate from the filter and thereby to control the rate of filtration, i. e., the extent to which the solid matter is removed from the water. Moving the valve 13 toward closed position decreases the flow through the pipe 11 and reduces the turbidity of the effluent or filtrate and vice versa.

There is provided a sampling chamber 14 whose lower portion receives effluent from the pipe 11, through the pipe 15, and whose upper portion discharges the effluent through a pipe 17 into the clear well 12 or, if desired, to waste. A riser 18 permits the escape of air or gases and a manually operable valve or cock 16 in the pipe 15 may be employed to control the flow of effluent through the sampling chamber. Normally, the flow of effluent is from the pipe 11, through the pipe 15, upwardly through the sampling chamber 14, and thence through the pipe 17 to the clear well 12 or to waste. A suitable light source 20 and lens 21 projects a parallel ray beam of light downwardly through the upwardly rising column of effluent. A light-responsive device, preferably a photo-electric cell 22, is mounted at one side of the sampling chamber 14, in a laterally extending chamber 23 thereof, and is adapted to receive light from the interior of the sampling chamber through a translucent or transparent wall portion thereof.

If the column of liquid flowing through the sampling chamber 14 is absolutely clear, the light beam passing downwardly therethrough will not be reflected into the photo-electric cell 22. However, when there are any solid particles present in the column of liquid, light is reflected therefrom into the photo-electric cell and the amount or quantity of light so reflected is a function of degree of turbidity of the liquid.

The photo-electric cell 22 is connected in series with its supply battery 26 and a resistance 27. The voltage drop across the resistance 27 is impressed on the control grid 25A of a screen grid electron amplifier tube 25 whose heater 25B is supplied with the usual heating current from a source not shown.

It will be understood that the cathode 25C is heated by the heater 25B, so as to provide a source of electron flow to the anode or plate 25D of the tube; the current in the plate circuit (viz., the anode-cathode circuit) of the tube being controlled by the control grid, and decreasing with a decrease of potential (or an increase of negative potential) on the control grid with respect to the cathode. The tube 25 illustrated is of the well-known pentode type, having also a screen grid 25E given a positive bias relative to the cathode, conveniently from the supply battery 26 of the photocell, and a suppressor grid 25F connected to and having the same potential as the cathode. It will be understood that the screen grid 25E is disposed between the control grid 25A and the plate 25D, to enhance voltage amplification by accelerating electron flow to the plate and to provide an electrostatic screen between the plate and control grid; and that the suppressor grid prevents undesirable increase of the screen current which would otherwise result from secondary emission at the plate; these being the usual structure and functions of the elements in a pentode. A condenser 30 is connected across the plate circuit of the tube 25, i. e., between the plate and the cathode, and is connected to the B battery 31 when the contacts 32 are closed, the negative side of the B battery 31 being connected to the cathode 25C, and the positive side to the anode 25D through contacts 32 (when closed). When the contacts 32 are closed, the battery 31 charges the condenser 30 and when the contacts 32 are opened the condenser 30 discharges through the tube 25 at a rate dependent upon the voltage on the control grid of the latter.

That is, the condenser discharge flows from the anode 25D to the cathode 25C, and the rate of such flow (e. g., the current) is determined by the voltage of the control grid 27; the less negative that voltage, the greater the current. The voltage on the control grid consists of the permanent but adjustable negative potential derived from a potentiometer 60 across a C battery 60A, reduced by the potential drop across the resistance 27, which is determined by the current in the photocell circuit; the output of potentiometer 60 and the resistance 27 being connected in series between the cathode 25C and the control grid 25A.

The condenser 30 is connected also across the grid-cathode of the electron tube relay 33 so that the grid 33C of this tube 33 is maintained sufficiently negative to cause complete cut-off of its plate current, or a substantial reduction in the same, until such time as the charge in the condenser 30 has been dissipated or materially reduced by discharging through the tube 25. When this has occurred, the tube 33 causes a relay 35, in its plate circuit, to operate. The heater 33B of the tube 33 is supplied with heating current from a suitable source, not shown.

It will be understood that the tube 33 is conveniently of the three-electrode type, having a cathode 33A (heated by the heater 33B), the control grid 33C and a plate or anode 33D. The plate circuit, between plate and cathode, includes the relay 35 and a B battery 35A in series; current flow in the plate circuit being cut off at times because of the negative potential impressed on the control grid 33C by the battery 31 (with contacts 32 closed), or when contacts 32 are open, by the condenser 30 until its charge has been dissipated or materially reduced, as described hereinabove. Hence the time at which current begins to flow in the plate circuit (to energize relay 35) after the opening of contacts 32, depends on the rate of discharge of condenser 30 through the tube 25, which in turn depends on the potential of the control grid 25A the potential of the latter being dependent or the amount of current flowing in the circuit of the photocell which includes the resistance 27

The relay 35, in conjunction with cam-controlled contacts presently to be described, controls the direction of rotation of a reversible motor 36 which is connected to the valve 13 to oper or close the same depending upon the direction of rotation of the motor shaft. This drive is effected by a worm 37 secured to the motor shaf and meshing with a worm-sector 38 secured to the shaft of the valve 13. The motor 36 may be of the shading coil induction motor type, such as that shown in Letters Patent of the United States No. 1,895,880, with its main field winding 40 energized from a 110 volt A. C. line (no shown) and one set of shading coils 41 connected across the contacts 43 and 44 and the other set of shading coils 42 connected across the contacts 45 and 46; the armature 47 of the relay 35 being connected to the cam-operated contact 48 When the back contacts 47—45 of the relay 35 are closed and the cam contacts 48—46 are also closed, the circuit of the set of shading coils 42 is closed and the motor 36 runs in one direction and when the front contacts 47—44 of the relay 35 are closed and the cam contacts 48—43 are also closed, the circuit of the other set of shading coils 41 is closed and the motor 36 runs in the opposite direction. When the circuits of both sets of shading coils are open, the motor does no run at all. Likewise when both shading coil circuits are closed the motor does not run.

The cam contacts are operated by cams 50, 5 secured to a cam shaft driven by a synchronou motor 52, such as that commonly employed in electric clocks, supplied from the usual A. C. lin (not shown). Assuming that the cam shaft i being driven at ¼ R. P. M., the cam 50 holds th contacts 32 open for one minute whereupon the close automatically and remain closed for thre minutes, and the cam 51 holds the contact 48—46 closed and the contacts 48—43 open fo thirty seconds whereupon the contacts 48—6 automatically open and the contacts 48—4 automatically close and the contacts 48—46 an 48—43 remain in the last described conditions fo three minutes and thirty seconds. The cam 5 closes its contacts 48—46 (and opens its contact 48—43) thirty seconds after the cam 50 open its contacts 32. It will now be apparent to thos skilled in the art that although the particula cycle of operation just described is one that ha been found convenient in at least a number o cases, the cycle may be varied to suit any par ticular set of operating conditions desired.

The apparatus is designed, constructed, ad justed and connected to operate substantially a follows. With the parts in the position showr the battery 31 charges or has charged the con denser 30. When the contacts 32 open, the con denser 30 discharges through the tube 25. Th current flowing through the photo-electric cel or tube 22 is proportional to the quantity of ligh which it receives and consequently the voltag impressed upon the control grid 25A of the tub 25 is proportional to the quantity of light re ceived by the cell 22. Therefore, the time it take to discharge the condenser 30 is inversely pro portional to the amount of light impinging o the photo-electric cell 22. Consequently the tim at which the relay 35 receives sufficient curren to cause its back contacts 47—45 to open, an its front contacts 47—44 to close, is dependent upon the amount of light impinging on the cell 22; the operating relation of the vacuum tubes and their control instrumentalities being as more particularly described hereinabove. Assume that the amount of light impinging on the cell 22 is such that the relay 35 causes its contacts 47—44 to close during the first thirty seconds following opening of the contacts 32. The contacts 47—44 and 48—43 are then both closed and the circuit of the set of shading coils 41 is closed to cause the motor 36 to operate the valve in one predetermined direction, until the contacts 48—43 are opened by the cam 51, whereupon the motor stops. Assume now that the amount of light impinging on the cell 22 is such that the relay 35 does not cause its contacts 47—44 to close (and contacts 47—45 to open) until after the contacts 48—43 have opened (and contacts 48—46 have closed). The circuit of the set of shading coils 41 will not have been closed but the circuit of the set of shading coils 42 is closed, by closure of contacts 48—46 and 47—45, and the motor 36 operates the valve in the opposite direction until the relay contacts 47—45 open, when the motor stops. If the relay contacts 47—44 close at the same time that the cam contacts 48—43 open, and the relay contacts 47—45 open at the same time the cam contacts 48—46 close, the motor 36 will not run in either direction.

If the effluent or filtrate does not have the desired clarity, the valve 13 is thus automatically closed until filtering takes place at such slower rate as to cause the filtrate to have the desired clarity. The valve adjustment is effected in increments, so to speak, i. e. the valve is moved toward closed position during each half-minute period determined by the cam-operated contacts, until the desired adjustment is effected. The extent of each adjustment of the valve 13 effected by the photo-cell controlled contacts is proportional to the amount by which the clarity of the sample differs from that desired, and abrupt and hunting movement of the valve is thus avoided. The filtering automatically takes place at the most rapid rate that will produce the desired clarity of filtrate so that maximum efficiency is attained at all times.

The apparatus may be adjusted to select the degree of clarity or turbidity desired by adjusting one or more of the following: the grid bias of the tube 25 as by means of the potentiometer 60, or the value of the resistance 27, or the plate voltage 31.

Figures 2, 4:
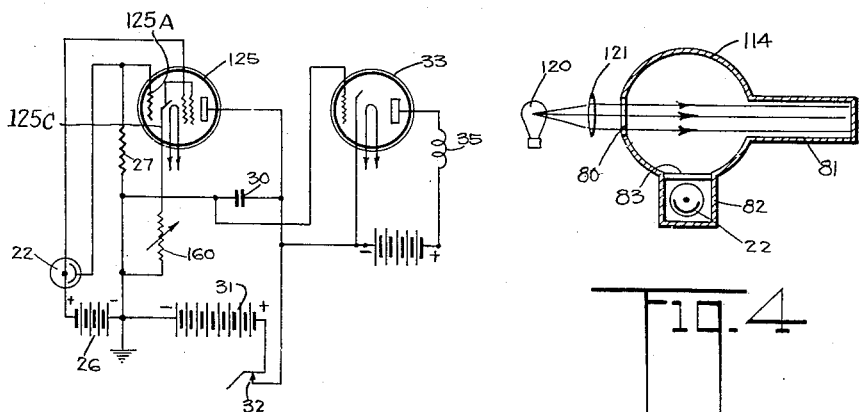
Fig. 2 is a wiring diagram showing a modification of the circuit of the tube 25 of Fig. 1—designated 125 in Fig. 2.
Fig. 4 shows, somewhat diagrammatically, a form of improved arrangement of the light-responsive apparatus.

The tube 25 may be made self-biasing, thereby eliminating or greatly reducing the effect of variations of the voltage of the battery 31 upon the tube, and thus increasing the stability of operation. This may be effected by modifying the connections of Fig. 1 as shown in Fig. 2. The tube 125 corresponds generally to the tube 25 and the elements 22, 26, 27, 30, 31, 32, 33 and 35 will at once be recognized in view of their description with reference to Fig. 1. It will be noted that cathode 125C of the tube 125 is biased by the drop across a variable biasing resistance 160 connected as shown. It will be understood that the structure and operation of Fig. 2 is the same as in Fig. 1, except that the battery 60A and potentiometer 60 are omitted, and the negative side of the battery 31 and the left hand terminal of the condenser 30 are connected to the cathode 125C through the variable resistance 160; whereby the bias on the control grid 125A (subject to the control of the drop across resistance 27 in the photo cell circuit) is obtained by the voltage drop across the resistance 160.

Figure 3:
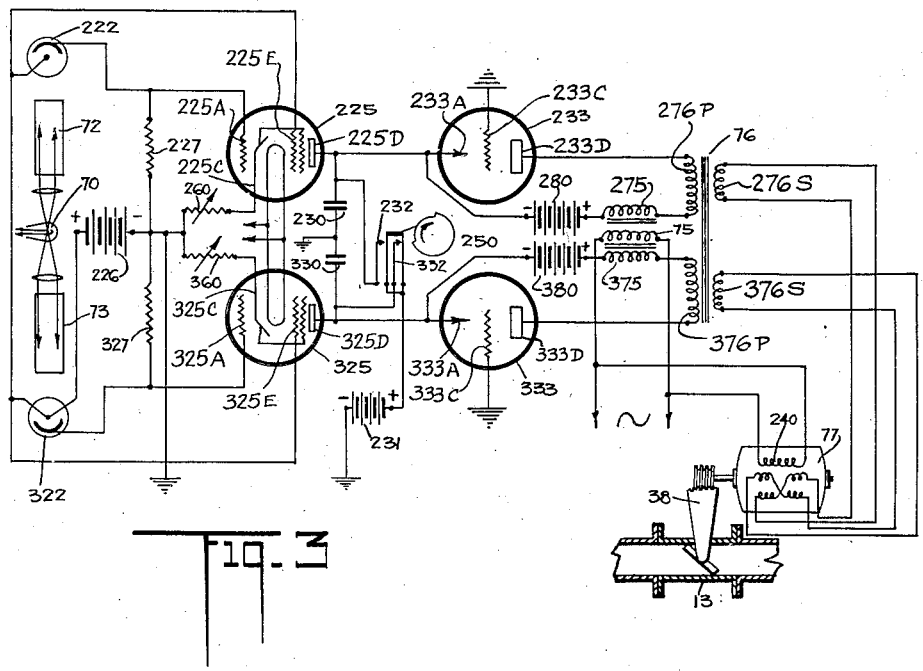
Fig. 3 is a diagrammatic view illustrating further modifications.

Further modifications are illustrated in Fig. 3 in which the elements 222, 225, 226, 227, 230, 231, 232 and 250 correspond to the elements 22, 25, 26, 27, 30, 31, 32 and 50 of Fig. 1, but with the tube 225 biased by means of a variable resistance 260 corresponding to biasing resistance 160 for the tube 125 in Fig. 2. A further modification will be noted in the substitution of a grid glow tube or gas discharge tube 233 for the tube 33 of Fig. 1, and also in the output circuit thereof. In Fig. 3 there is a second set-up 322, 325, 327, 330, 332, 333 and 360 in parallel with the set-up 222, 225, 227, 230, 232, 233 and 260. The photoelectric cells 222, 322 receive light from a single light source 70 and lens system, and through chambers 72, 73, one of which contains material undergoing treatment and the other material of the standard at which it is desired to maintain the treated material. For example, the material being treated may be a filtrate such as that flowing through the pipe 15 in Fig. 1 and the standard may be water having the desired degree of turbidity or clarity.

The output circuit of each of the tubes 233, 333 contains a corresponding secondary winding of a modulating transformer 75 and a corresponding primary winding of a transformer 76. The primary of the transformer 75 is connected to a suitable supply (not shown) of alternating current, which supplies also the main winding 240 of the motor 77. The motor, preferably of the reversible shading coil type, may be employed to operate a valve such as the valve 13 in Fig. 1 for controlling the rate of flow of the treated material through a filter. The secondary windings of the transformer 76 are so connected to the shading coils of the shading coil motor 77 as to cause the rotor of the motor to operate the valve 13 toward closed position when the sampled filtrate is too turbid as compared with the standard, and to cause the rotor to operate the valve 13 toward open position when the sampled filtrate is less turbid than the standard. In this way, the filtrate or effluent is automatically maintained substantially at the desired standard. It will be understood that the cam 250 is operated in the manner that the cam 50 is operated in Fig. 1, i. e. the cam 250 is continuously rotated at ¼ R. P. M. and it connects the battery 231 to the contacts 232, 332 for three minutes out of every four. The motor 77 may be like that shown in Fig. 2 of copending application Serial No. 74,895, filed April 17, 1936, by John R. MacKay, and similarly connected.

It will be understood that the circuit of each photo cell includes the common supply battery 226, which is also used for positive bias on the screen grids 225E, 325E of the pentodes 225, 325, as in Fig. 1. Variation of the light on the photocell 222 causes variation in the current through the resistance 227 in its circuit, and the resulting variation of the drop across the resistance 227, being impressed on the control grid 225A, correspondingly varies the rate at which the condenser 230 may discharge through the tube 225 from its plate 225D to its cathode 225C when the contacts 232 are opened. Thus the greater the light on the cell 222, the more current through the resistance 227 and the faster the rate of discharge of the condenser. The rate of discharge of condenser 330 through the tube 325 from its plate 325D to its cathode 325C is similarly controlled by the current which passes through the resistance 327 (connected to the control grid 325A) and which is dependent on the amount of light striking the cell 322. Until the contacts 232, 332 open, the control grids 233C, 333C of the grid glow tubes 233, 333 are kept at a negative potential by the common battery 231, so that no current flows in the circuit of the plate 233D and cathode 233A of the tube 233 or in the circuit of the plate 333D and cathode 333A of the tube 333; it being understood that the grid glow tubes 233 and 333 have a relay-like action such that upon change of the grid potential to a predeterminable value (less negative than battery 231), plate current flow takes place, with ionization.

As indicated hereinabove, there are connected in series between the plate 233D and cathode 233A of the tube 233 one primary winding 276P of the output transformer, one secondary winding 275 of the transformer 75 whose primary winding 75P is connected to an A. C. supply line, and a battery 280. The plate circuit of the tube 333 likewise includes a primary transformer winding 376P, a secondary winding 375, and a battery 380. When the contacts 232, 332 close, and after the condensers 230, 330 have discharged to an extent where the negative grid voltages of the tubes are respectively reduced to the operating point as described above, pulsating currents flow through the windings 276P and 376P. The two pairs of shading coils of the motor 77 being so connected to the secondaries 276S and 376S of transformer 76 that the pairs of coils respectively tend to effect rotation of the motor in opposite directions, no operation of the motor results when both the tubes 233 and 333 are operating. Thus if the tested (sampled) liquid in, say, chamber 72 is of the same turbidity as the standard in chamber 73, both photo cells will receive the same light, both condensers 230 and 330 will discharge at the same rate, and the plate circuit of the tube 233 will step off at the same time in the cycle as that of the tube 333 (say, at the middle of the cycle), so that no rotation of the motor will result in the given cycle.

However, if the sampled liquid in chamber 72 is of less turbidity, the cell 222 receives more light, the condenser 230 discharges more rapidly (in proportion), and the plate circuit of the tube 233 goes into operation for an interval in the cycle before the plate circuit of tube 333 fires; during such interval, thus proportioned to the extent of the variation in turbidity, the motor shading coils connected to the winding 276S are alone energized, and the motor operates the valve in a direction to increase turbidity. Likewise, if the sampled liquid is more turbid than the standard, the tube 233 will lag behind the tube 333 in firing, and during the intervening interval (again proportioned to the turbidity difference) the motor will be operated in the opposite direction by its other set of shading coils (energized from winding 376S). In either case, the motor stops when both tubes are operating, and also remains at rest when both are inactive; the only time of motor operation is the interval in each cycle by which one tube may lead the other in firing. As explained, the illustrated system is conveniently arranged so that such intervals exist only when the sampled liquid departs appreciably from standard; and the length of each such interval is proportioned to the extent of departure.

It will also be understood that although I now prefer to employ a battery in series with each secondary winding of the transformer 76 (as shown), so as to obtain thereby substantially full wave modulation of the plate current supplying the tubes 233 and 333, it is possible in some cases to dispense with these batteries entirely and still effectively control the motor 77; but omission of the batteries may result in some reduction in sensitivity, since the plate current will then flow in the circuit of the activated tube only during the positive alternation of each cycle of the line current.

The form of invention shown in Fig. 3 has the advantage set forth in connection with Fig. 2. It has additional advantages, e. g. freedom from derangement by variation in intensity of the light source 70 due to aging or line voltage changes. As in the case of Fig. 1, the combination is sensitive, rugged, and adapted effectively to operate a valve as shown or a recorder or other instrumentalities (not shown).

While in some cases a buffer tube, preferably a low grid current electron tube operated below ionization voltage on any electrode, may be advantageously employed between each photo-cell 22, 222, 322 and its associated tube 25, 225, 325, I have, for the sake of simplicity in disclosure, shown only the simpler arrangements.

In Fig. 4 I have shown, in a somewhat diagrammatic plan view, a satisfactory form of sampling chamber which may be employed in the combinations described. The light source 120 supplies rays to the lens 121 which passes a parallel ray beam of light through the glass window 80, provided in the sampling chamber 114, through the liquid therein, which may be an upwardly flowing stream of filtrate, and thence into a light absorbing tube 81 which is provided on its interior surfaces with a black, non-reflective, light-absorbing material. The photo-electric cell 22 is located in a sub-housing 82 and looks, so to speak, at the beam in the sampling chamber through a glass window 83. The cell 22 is thus situated so as to receive only scattered light, i. e., substantially the only light affecting it is that reflected by solids suspended in the liquid. Indeed, the chamber 114 is conveniently enlarged adjacent the locality of observation by the cell 22, as shown, so as to provide a substantial body of liquid on either side of the light beam, and minimize the effect of reflection from the interior of the container.

Figure 5:
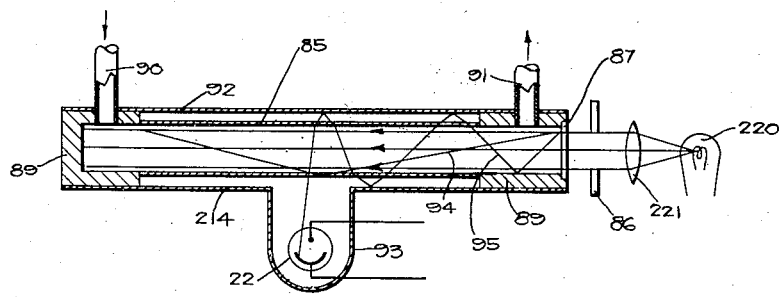
Fig. 5 is a view similar to Fig. 4 but illustrating a modification which I now prefer.

While the apparatus just described has the advantage of comparative simplicity and may in many cases be satisfactorily employed, I have devised a preferred form of apparatus which is shown in a somewhat diagrammatic plan view in Fig. 5, and which I shall now proceed to describe.

Light from the source 220 is projected through the lens 221, through the aperture in a diaphragm 86, through a glass window 87, into the glass tube 85, in a parallel beam. The glass tube 85 is mounted in metallic caps or end members 89, one provided with an inlet duct 90 and the other with an outlet duct 91 for passing through the tube 85 a stream of the material (e. g. filtrate) to be scanned. One of the caps is provided with the glass window 87 referred to above. An opaque tube 92, having an extension to form a sub-housing 93, surrounds the glass tube 85 in spaced relation with respect thereto. The interior surfaces of the tube 92 and housing 93 are coated with a suitable black, non-reflecting, light-absorbing, material. The housing 93 contains the photo-electric cell 22 which looks at the beam passing through the glass tube 85. When there is a perfectly clear liquid in the glass tube 85, no light should enter the photo cell 22. In the absence of preventive means, stray light would enter the cell 22 in these and other circumstances, and would produce erroneous and undesired operations. However, the apparatus shown in Fig. 5 is so designed and constructed that any and all stray rays of light, such as ray 94, entering through the glass window 87 (which is the only place that light may enter the casing 89—92—93—89) will be totally internally reflected by the glass tube 85 and thus will not reach the cell 22. More oblique stray rays, as ray 95 (i. e. any rays so oblique that they would not be totally reflected by the tube 85), would have to suffer at least two or more reflections from the black, non-reflecting, light-absorbing interior of the tube 92 before reaching the photoelectric cell 22, and thus are attenuated to a point where their effect is negligible in comparison with the quantities under observation or measurement.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use within the scope of the appended claims.

What I claim is:

1. Control apparatus for a material treating system producing results of treatment optically detectable in the treated material, said control apparatus being of the type which is normally balanced when the treated material has a desired standard condition and which is adapted, upon unbalance by optically detectable change of condition in the treated material, to be restored to balance by restoration of said standard condition in the material after treatment, said apparatus comprising in combination, light-responsive means for scanning material, said scanning means being adapted for association with a treating system of the aforesaid character to scan material treated thereby, treatment-controlling means associable with such treating system and adapted to control same for changing the treatment of the material in optically detectable respects, and means controlled by said scanning means for causing said second mentioned means to change the treatment of the material intermittently and progressively until it has been restored to a desired standard condition from which it has departed, said light-responsive means including means detecting the extent of a departure of the material from standard condition, and having associated means responsive to said last-mentioned means for proportioning the operation of the second mentioned means to the detected extent of departure from standard.

2. Control apparatus adapted for a system for treating material, comprising, in combination, means for treating material to produce results optically detectable in the treated material, light-responsive means controlled by the condition of the treated material and including means associated with said treating means for scanning the material treated by said treating means, means controlling the treating means for altering the treatment to change the condition of the treated material in optically detectable respects, and time-controlled means periodically subjecting said last mentioned means to control by said light-responsive means for correcting the condition of the treated material, said light-responsive means including means directly responsive to the extent of a variation in the condition of the treated material for limiting the operation of the treatment-altering means in accordance with said extent of variation.

3. Control apparatus for a material treating system producing results of treatment optically detectable in the treated material, said control apparatus being of the type which is normally balanced when the treated material has a desired standard condition and which is adapted, upon unbalance by optically detectable change of condition in the treated material, to be restored to balance by restoration of said standard condition in the material after treatment, said apparatus comprising in combination, a reversible motor and treatment-controlling means operated thereby and associable with a treating system of the aforesaid character and adapted to control such system for changing the treatment of the material in optically detectable respects, light-responsive means adapted for association with such treating system, for scanning the treated material, and means controlled by said scanning means for intermittently operating said motor in one direction or intermittently operating said motor in the opposite direction dependent upon the character and extent of departure of the treated material from a desired standard, said light-responsive means including means detecting said extent of departure, for the aforesaid control of the motor-operating means in response thereto.

4. In combination, light-responsive means for scanning liquid, liquid-handling means controllable to produce optically detectable changes in the liquid to be scanned by the scanning means, and including means for controlling flow of liquid through said controllable means, to control the latter, said scanning means being associated with said liquid-handling means for scanning liquid handled by the latter, control circuit means including a condenser dischargeable therein, means normally charging said condenser, means for intermittently dissociating said condenser from the charging means to cause the condenser to discharge, means under control of the light responsive means for controlling said control circuit means to adjust the rate of discharge of said condenser, and means controlled by the rate of discharge of the condenser for operating said flow-controlling means.

5. In combination, means for treating material to produce results optically detectable in the treated material, light-responsive means associated with said treating means for scanning the material treated by said treating means, and means for making corrective changes in treatment of the material, including a source of electric current, a condenser adapted to be charged therefrom, a discharge circuit for said condenser, vacuum tube means for controlling said discharge circuit and biased to control discharge of said condenser at a predetermined rate and having control electrode means connected for control by said light-responsive means to vary the rate of condenser discharge, and means connected to said discharge circuit and controlled in accordance with variation of the rate of condenser discharge from the predetermined rate, for controlling the treating means, to change the treatment of the material.

6. Control apparatus adapted for a system for treating material, comprising, in combination, means for treating material to produce results optically detectable in the treated material, means for illuminating both material treated by said treating means and a standard for such material, from a common source of light, light-responsive means for scanning said material and said standard, said illuminating means and scanning means being associated with said treating means, treatment-controlling means controlling said treating means for changing the treatment of the material, an alternating current motor for driving said treatment controlling means, having shading coils for causing the motor to run in one direction or the other in accordance with the direction of current flow in said shading coils, vacuum tube means for causing current to flow in one direction in said shading coils, vacuum tube means for causing current to flow in the other direction in said shading coils, each of said vacuum tube means having a control electrode means, intermittently operable means under control of said light-responsive means and controlling said control electrode means respectively for biasing one of said vacuum tube means against operation during an interval corresponding to the condition of the standard, and for biasing the other of said vacuum tube means against operation during a simultaneously commencing interval variable in accordance with variations in the condition of the material.

7. In combination, light-responsive means for scanning material to detect the extent of variations of the condition of the material from a desired standard, a control circuit including a condenser, charging means for the condenser, means for initiating discharge of the condenser, means under control of the light-responsive means for controlling said circuit to adjust the rate of discharge of the condenser in accordance with the condition of the material, translating means and means controlled by said condenser and in accordance with the rate of discharge of the condenser, for operating said translating means to an extent corresponding to the extent of a detected variation of the condition of the material.

8. In combination, means for handling bodies of a plurality of materials respectively, common means for illuminating said plurality of materials, light-responsive means for scanning each of said materials to detect the condition thereof, a plurality of circuits and a plurality of condensers respectively included therein, respectively corresponding to the plurality of materials, charging means for the condensers, means for initiating discharge of the condensers in timed relation, means under control of the light-responsive means for controlling said circuits to adjust the rates of discharge of the condensers respectively in accordance with the detected conditions of the materials, means for changing the condition of one of the materials to be received in said handling means, in optically detectable respects, and control apparatus controlled by said circuits and in accordance with the relative rates of discharge of the condensers, for adjusting said condition changing means to an extent dependent on variations of the rate of discharge of one condenser relative to the rate of discharge of another.

9. Apparatus for translating optically detectable changes of condition of a material into mechanical movement, comprising in combination, light-responsive means for scanning material to detect the extent of optically detectable variations of the condition of the material from a desired standard, said light-responsive means including means adapted to inspect successive portions of a body of the material, a motor, means controlled by the scanning means for intermittently operating said motor in response to a detected variation of the condition of the material, said last mentioned means including energizing means adapted for alternately initiating and interrupting operation of the motor, and means under control of the scanning means and controlling said energizing means for proportioning the duration of each said intermittent operation of the motor, to the extent of the variation of condition of the material then detected by the scanning means.

10. In combination, light-responsive means for scanning two materials to be compared, to detect the condition of each, a control circuit, means including electron discharge means having a control electrode controlled by said light-responsive means, for generating in said control circuit an electrical quantity corresponding in extent to the condition of one of the materials, a second control circuit, means including electron discharge means having a control electrode controlled by said light-responsive means, for generating in said second control circuit an electrical quantity corresponding in extent to the condition of another of the materials, means connecting both said electron discharge means for energization from a common source of electrical energy, translating means, and means controlled by said control circuits and in accordance with the relative extent of said electrical quantities, for operating said translating means to an extent variable with the variations in the difference of said quantities, whereby the extent of a difference in condition, between the materials, is converted into operation of the translating means while effects of variations in energy supply to the electron discharge means are minimized.

11. In combination, light-responsive means for scanning a plurality of materials to detect the condition of each, a plurality of control circuits and condensers respectively included therein, respectively corresponding to the plurality of materials, means for charging said plurality of condensers from a common source of potential, means for initiating discharge of the condensers, means under control of the light-responsive means for controlling the control circuits to adjust the rates of discharge of the condensers respectively in response to the detected conditions of the materials, translating means and means controlled by the control circuits and in accordance with the relative rates of discharge of the condensers for operating the translating means to an extent corresponding to the extent of difference in the detected conditions of the materials.

12. Apparatus for translating optically detectable changes of condition of a material into positional adjustments, comprising in combination, light-responsive means for scanning material to detect the extent of optically detectable variations of the condition of the material from a standard, said light-responsive means including means adapted to inspect successive portions of a body of the material, movable means, means for adjusting the position of said movable means, means controlled by the scanning means for intermittently operating said adjusting means in response to a detected variation of the condition of the material, said last mentioned means including control means adapted for alternately initiating and interrupting operation of the adjusting means, and means under control of the scanning means and controlling said control means for proportioning the extent of each positional adjustment of the movable means by the adjusting means, to the extent of the variation of condition of the material then detected by the scanning means.

13. Apparatus for translating optically detectable changes of condition of a material, comprising in combination, light-responsive means for scanning material to detect the extent of optically detectable variations of the condition of the material from a standard, said light-responsive means including means adapted to inspect successive portions of a body of the material, energizable translating means for translating energization thereof into other work in accordance with the amount of energy supplied thereto, means controlled by the scanning means for intermittently operating said translating means in response to a detected variation of the condition of the material, said last mentioned means including energizing means adapted for alternately initiating and interrupting operation of the translating means, and means under control of the scanning means and controlling said energizing means for proportioning the amount of energy supplied to said translating means in each said intermittent operation of the latter, to the extent of the variation of condition of the material then detected by the scanning means.

14. In light-sensitive translating apparatus, the combination, with means for supporting material to be optically inspected, of light-responsive means for inspecting material in said supporting means to detect optically detectable characteristic of the condition of the material, a translating device operable to convert operation thereof into other work in accordance with the duration of operation thereof, and means electrically controlled by the light-responsive means and controlling the translating device, for converting optically detectable departure of the condition of the material from a standard, into operation of the translating device for a time proportional to the extent of said departure, said electrically controlled means including control circuit means under control of the light-responsive means for producing an electrical effect corresponding to the detected condition of the material, delayed response means controllable by said control circuit means and including output circuit means, and settable into operation, for producing an electrical effect in said output circuit means which is delayed from the time of setting of the response means into operation by a delay time corresponding to the extent of the first-mentioned electrical effect in the control circuit means, control means for setting the delayed response means into operation at a desired time, and means controlled by said control means and electrically by said output circuit means and in response to departure of the aforesaid delay time from a standard time of delay, for operating the translating device for a period corresponding to the extent of said departure of the delay time.

15. Apparatus for treating liquid comprising in combination, means for treating the liquid to remove solid matter therefrom, light-responsive means controlled by the solid matter content of the treated liquid and including means for scanning the treated liquid, means for controlling said first mentioned means to change the solid matter content of the treated liquid, and time-controlled means periodically subjecting said third mentioned means to control by said light-responsive means for correcting the solid matter content of the treated liquid.

16. Apparatus for purifying water comprising in combination, a filter, light-sensitive means for scanning the effluent from the filter, means adjustable to control the rate of flow of water through the filter, means operable to adjust said second-mentioned means, and means controlled by said light-sensitive means for intermittently bringing said third mentioned means into operation to adjust the second mentioned means by progressive increments, whereby the rate of flow through the filter may be corrected in accordance with the condition of the effluent as scanned by the light-sensitive means.

17. In combination, means for treating material, light-responsive means for scanning the material undergoing treatment, and means for intermittently and progressively effecting corrective change in treatment of the material, including means for periodically establishing a flow of current which normally varies at a predetermined rate, means under control of said light-responsive means for altering the rate of variation of said flow of current, and means connected for control by said varying flow of current, for controlling the treating means, to change the treatment of the material in accordance with alteration of the rate of variation of said flow of current.

18. Apparatus for purifying water comprising in combination, a filter, a light-responsive device for detecting solid matter in the filtered water, means for changing the rate of discharge of water from the filter, and means controlled by said light-responsive device for causing said first-mentioned means to change the rate of discharge of water intermittently and progressively until it has been restored to a desired standard condition of solid matter content, from which it has departed.

19. In apparatus for translating optically detectable changes of condition of a material, the combination, with means for supporting material to be optically inspected, of light-responsive means for inspecting material in said supporting means to detect an optically detectable characteristic of said material, energizable translating means for translating energization thereof into other work measured by the duration of energization thereof, an electrical condenser, means for modifying the charge thereof comprising charging means and discharging means, control means including an electron discharge device, for controlling the translating means, said electron device having a control electrode connected for control in electrical bias by the condenser in accordance with the state of charge thereof, and said light-responsive means being adapted to control one of the aforesaid charge-modifying means to change the electrical charge of the condenser at a rate measured by the optically detected characteristic of the material, and intermittent cycling means including means selectively controlling the charge-modifying means for periodically initiating and interrupting change in the state of charge of the condenser under the aforesaid control of the rate of said change by the light-responsive means, said control means being controlled by the cycling means and in response to predetermined condition of bias of the control electrode of the electron device, for effecting energization of the translating means, in each cycle of operation of the cycling means, for a period governed by the time in the cycle at which the changing condenser charge passes through a predetermined value.

20. In apparatus for translating optically detectable changes of condition of a material, the combination, with means for supporting material to be optically inspected, of light-responsive means for inspecting material in said supporting means to detect an optically detectable characteristic of said material, energizable translating means for translating energization thereof into other work measured by the duration of energization thereof, electron discharge means for controlling said translating means and having a control electrode, a condenser having a circuit for charging the same, said condenser being adapted to control said control electrode to render the electron discharge means operative only upon absence of charge of predetermined value in the condenser, said light-responsive means having connections adapted to effect discharge of the condenser at a rate measured by the optically detected characteristic of the material, and intermittent cycling means comprising means for intermittently interrupting and restoring connection of the condenser to its charging circuit at predetermined times, to effect energization of the translating means, in each cycle, for a period governed by the time in the cycle at which the condenser has been discharged, by the aforesaid connections, to a charge below said predetermined value.

DAVID CRAMPTON.